April 9, 1946.  H. HARRIS, JR  2,397,961
DETECTOR
Filed Feb. 1, 1943

INVENTOR
HERBERT HARRIS, JR.
BY
ATTORNEY

Patented Apr. 9, 1946

2,397,961

UNITED STATES PATENT OFFICE 2,397,961

DETECTOR

Herbert Harris, Jr., Cedarhurst, N. Y., assignor to Sperry Gyroscope Company, Inc., Brooklyn, N. Y., a corporation of New York Application February 1, 1943, Serial No. 474,393

7 Claims. (Cl. 250—27)

My invention relates to circuits for discharge devices and concerns particularly detectors for modulated oscillatory quantities.

It is an object of my invention to provide an improved detector which is capable of separating the modulation component from a carrier frequency, although the frequency of the modulation and the frequency of the carrier may be relatively close together. It is a further object of my invention to provide a detector which requires no filter for elimination of carrier frequency, and which thus introduces no error such as may result from filtering, which is free from undesired effects on modulation and which particularly avoids introducing any delay in the useful signal of the character caused by filtering.

Other and further objects and advantages will become apparent as the description proceeds.

In accordance with my invention in its preferred form, I provide a circuit for introducing a 90° phase lag in the input signal or for converting the input signal into two signals in quadrature with each other, and I pass both the signals through squaring devices for producing signals proportional to the squares of the signals which are in quadrature. Furthermore, I provide means for combining the two squared values so as to obtain an output magnitude proportional to the envelope of the input modulated signal. The output magnitude is thus proportional to the modulation of the input signal and the carrier frequency of the input signal is wholly eliminated from the output.

A better understanding of the invention will be afforded by the following detailed description considered in connection with the accompanying drawing in which Fig. 1 is a circuit diagram of one embodiment of my invention.

Figure 1:
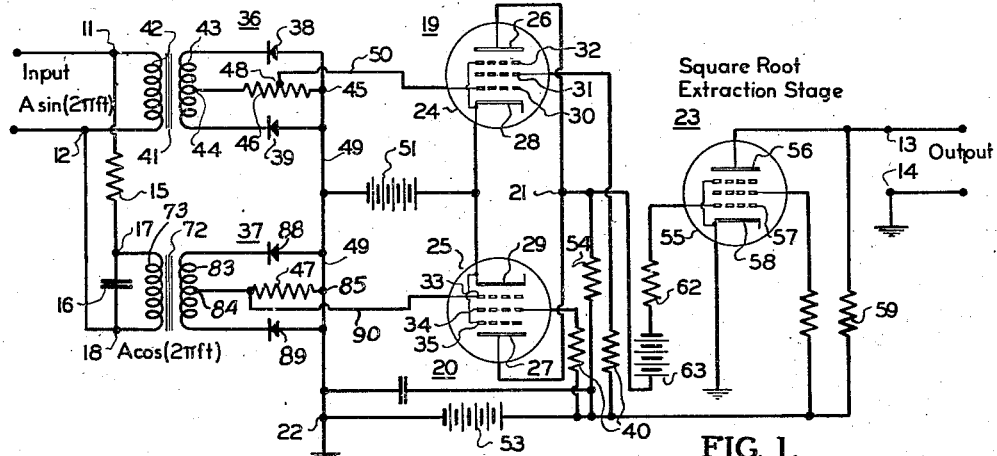

In the embodiment of my invention shown in Fig. 1, for the sake of illustration, there is a pair of input terminals 11 and 12 to which an input signal may be applied, and there is a pair of output terminals 13 and 14 to which a value proportional to the modulation or envelope of the input signal is intended to appear. For example, if the input signal is a modulated high frequency alternating voltage, it may be expressed in terms of time, $t$, by the equation $e = A \sin 2\pi ft$. The value $A$ is a variable representing the peak value of the voltage during any cycle of the input wave, which is called the modulation or the envelope of the wave at that point. The value $A$ itself fluctuates, and the voltage value $A \sin 2\pi ft$ thus represents the combination of voltages of two frequencies, a relatively high carrier frequency $f$, and a relatively low modulating frequency represented by the frequency of variation of the factor $A$. An object of detection is to eliminate the frequency component $f$ to obtain a value proportional to the envelope or value $A$.

To this end, a phase-splitting arrangement is employed. For example, a phase lagging circuit consisting of a resistor 15 and a condenser 16 in series is connected between the input terminals 11 and 12. The condenser terminals 17 and 18 represent the output terminals of the phase lagging circuit. The resistance of the resistor 15 is made relatively large in comparison with the impedance of the condenser 16 at the frequency $f$ of the sine wave so that a voltage appears between the terminals 17 and 18, which is in quadrature with the input voltage, and may be represented by the expression $A \cos 2\pi ft$.

Suitable means such as squaring circuits 19 and 20 are connected to the terminals 11 and 12 and the terminals 17 and 18 for producing magnitudes proportional to $A^2 \sin^2 (2\pi ft)$ and $A^2 \cos^2(2\pi ft)$, respectively. Since the sum of the square of the sine of a quantity and the square of the cosine of the same quantity is equal to unity in accordance with a theorem of trigonometry, the two squared values are combined to form a resultant voltage proportional to $A^2$, appearing between a pair of intermediate terminals 21 and 22. A suitable device 23 for extracting a square root of the voltage between terminals 21 and 22 is interposed between these terminals and the output terminals 13 and 14, so that the modulation or amplitude of the input wave appears between the output terminals 13 and 14.

For converting an input voltage into a voltage having a value proportional to the square of the input voltage an amplifier or relay of suitable characteristics may be employed such as an electric discharge device of the vacuum tube type, for example. Although my invention is not limited to the use of any particular type of tube, I believe that among the tubes at present available a suitable characteristic curve may be obtained most readily by the use of a multi-grid tube. For example, as shown in the drawing, I may employ a pair of pentodes or triple grid vacuum tubes 24 and 25 such as pentodes of the 6K7 type. As shown, the tubes comprise anodes 26 and 27, cathodes 28 and 29 and a plurality of control electrodes. Thus tube 24 includes a first control electrode or grid 30, a second electrode or screen grid 31 and a third electrode or grid 32, the last of which may take the form of a suppressor grid connected to the cathode 28. The tube 25 includes corresponding respective control electrodes 33, 34 and 35.

In order that the tubes 24 and 25 may function as squaring devices for negative as well as positive voltages applied between the pairs of terminals 11 and 12 and 17 and 18, I may interpose rectifiers 36 and 37. The rectifier 36 comprises a pair of rectifier elements 38 and 39 connected to form a full wave rectifier. For example, a biphase connection may be employed by utilizing a transformer 41 having primary winding 42 connected to the input terminals 11 and 12, having a secondary winding 43, the ends of which are connected to the negative terminals of the rectifier elements 38 and 39 with an intermediate terminal 44 serving as a negative rectifier output terminal. The other rectifier output terminal is the junction 45 of the positive terminals of the rectifier elements 38 and 39. A load resistor 46 may be connected between the terminals 44 and 45 and the load resistor 46 may be connected in the input circuit of the tube 24.

The rectifier 37, which is generally similar to rectifier 36, includes a pair of rectifier elements 88 and 89 having negative terminals connected to the ends of center-tapped secondary winding 83 of a transformer 72 having a primary winding 73 connected to input terminals 17 and 18. The center tap 84 of the transformer secondary winding 83 is connected to one end of a load resistor 47, the other end of which is connected at terminal 85 to the positive terminals of the rectifier elements 88 and 89. The load resistor 47 is connected in the input circuit of the tube 25.

Some attenuation of the input voltage necessarily occurs in the phase lagging circuit consisting of the units 15 and 16. This attenuation is preferably compensated by utilizing tubes 24 and 25 with different amplification constants or by introducing greater attenuation in the input to the tube 24. For example, a portion of the load resistor 46 of the rectifier 36 may be tapped off to serve as the input to the tube 24. As illustrated, this is accomplished by providing an intermediate terminal 48 in the resistor 46.

The input circuit of each of the tubes 24 and 25 may comprise connections between the cathode of the tube and one of the control electrodes, ordinarily the first or second control electrode of the tube. In the arrangement shown, the first control electrodes or grids 30 and 33 are employed for the input circuits. The input circuits include a connection 49 from the cathodes 28 and 29 to the rectifier terminals 45 and 85. A portion of the resistor 46 between the terminals 45 and 48, and a connection 50 to the grid 30 complete the input circuit of the tube 24, while the resistor 47 and a connection 90 to the grid 33 complete the input circuit of the tube 25. Preferably a bias voltage source such as a C battery 51 is also included in the input circuits, e. g., between the cathodes 28 and 29 and the connection 49.

For energizing the tubes 24 and 25 a source of voltage such as a B battery 53 is provided, having a negative terminal 22 connected through a ground connection to the cathodes 28 and 29 and a positive terminal connected to the anodes 26 and 27. For combining the outputs of the tubes 24 and 25 at the terminal 21 a common anode resistor 54 is connected between the positive terminal of the B battery 53 and the intermediate terminal 21, to which the anodes 26 and 27 are connected.

In the arrangement shown by way of illustration, the screen grids 31 and 34 of the tubes 24 and 25 are connected to the positive terminal of the voltage supply 53 through dropping resistors 40.

The square root extracting device 23 may also take the form of an electric or discharge device such as a vacuum tube. As shown, it comprises a pentode 55 having an anode 56, control electrode or grid 57 and a cathode 58 as well as additional grids. The same energizing source 53 may be utilized and a load resistor 59 may be connected between the positive terminal of the source 53 and the anode 56.

The control electrode 57 is coupled to the intermediate terminal 21 through a grid resistor 62. As shown, a fixed bias source such as a C battery 63 is interposed in series with the grid lead resistor 62 for negatively biasing the control electrode 57. The voltage of the C battery 63 is so chosen as to give the anode voltage-grid voltage curve of the tube 55 the desired square-root characteristic within the range in which it is operative.

As shown in the drawing, for convenience in assembly, the connections to the negative terminal of the source 53 may be made by grounding this terminal and grounding the points intended to be connected thereto. However, my invention is not limited to the use of a grounded circuit.

Figure 2:
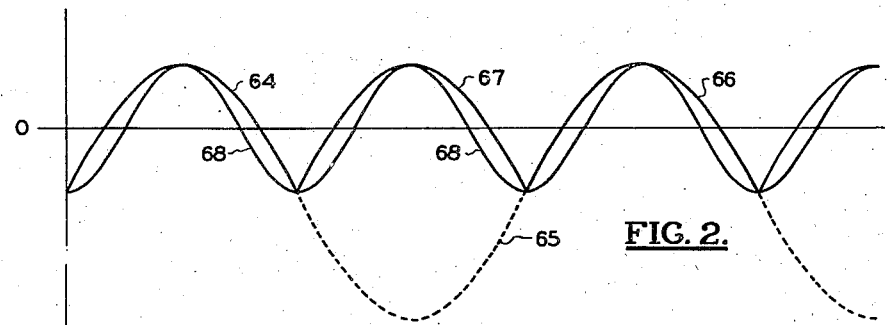
Fig. 2 is a graph explanatory of the principle of operation of the invention.
Figure 3:
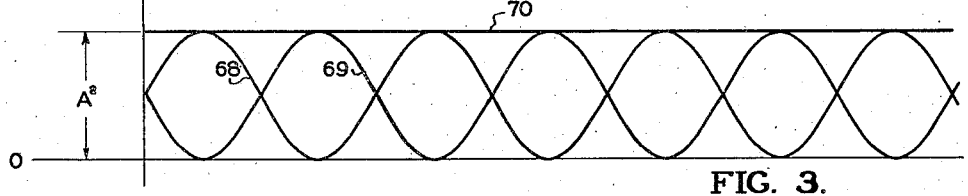
Fig. 3 is another graph further explanatory of the principle of operation.

The effect of introducing the phase lag and converting the voltages into squared values is represented graphically in Figs. 2 and 3. Thus in Fig. 2, the input wave $A \sin 2\pi ft$ is represented by a sinusoidal curve consisting of a positive loop 64 shown by a solid line, a negative loop 65 shown by a dotted line, another positive loop 66, shown by a solid line again, and so on. The rectifier 36 however converts the negative loop so as to form a positive loop 67 in its place. The output wave from the rectifier 36 accordingly takes the form represented by the positive loops 64, 67 and 66 and so on. This wave, when applied to the control electrode 30 of the tube 24 results in a discharge current in the tube 24 proportional to the square of the wave. This is represented by a double frequency sine wave 68. Since this current is drawn through the load resistor 54 the component of the voltage drop therein due to the fluctuating anode current of the tube 24 is also of the form represented by the double frequency sine wave 68.

The input wave to the control electrode 33 of the tube 25 is similar to that applied to the tube 24 but is displaced 90° in time phase. Consequently, the resultant double frequency squared wave is also displaced 90° (in terms of the fundamental frequency). The squared wave proportional to the discharge current of the tube 25 may therefore be represented as shown in Fig. 3 by a double frequency sine wave 69 which is 90° out of phase with respect to the wave 68 (in terms of the fundamental frequency) or 180° out of phase in terms of the double frequency. Thus the sum of the two waves 68 and 69 is a constant non-fluctuating or uniform voltage represented by the horizontal line 70. Since the anode currents of both tubes 24 and 25 are drawn through the same anode resistor 54, the voltage drop therein resulting from the application of a sine wave, $A \sin 2\pi ft$, to terminals 11 and 12, is a constant voltage drop represented by the constant value 70 so long as the envelope A of the wave is constant.

Fluctuations in the envelope of the wave result in fluctuating voltage at the intermediate terminal 21 representing, $A^2$, the square of the modulation or envelope of the input wave $A \sin 2\pi ft$.

Since as stated, the vacuum tube stage 23 is arranged to have a characteristic curve in accordance with the square root or one-half power law, the output voltage between the terminals 13 and 14 fluctuates in accordance with the square root of the voltage $A^2$ at the intermediate terminal 21. Thus, the voltage at the output terminals 13, 14 is a voltage proportional to the modulation A.

Although I have shown a specific arrangement in Fig. 1 for producing phase quadrature between the alternating current voltages applied to the rectifiers 36 and 37, it will be understood that my invention is not limited to the specific arrangement illustrated and described. For substantially equalizing the voltages applied in the two rectifier circuits and improving the degree of phase quadrature relationship obtained between the two voltages, I may utilize a phase-splitting arrangement, such as illustrated in Fig. 4.

Two output voltages are produced in response to the input signal between the terminals 11 and 12, one output voltage being advanced and the other retarded, so as to produce phase quadrature.

Figure 4:
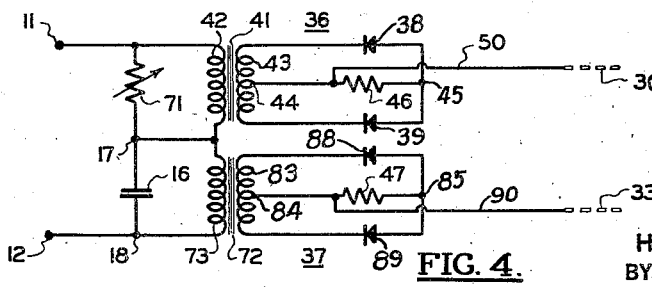
Fig. 4 is a fragmentary diagram of a modified circuit utilizing a different phase-splitting arrangement.

As shown in Fig. 4, an adjustable resistor 71 is connected in series with the phase lagging condenser 16 across the input terminals 11 and 12. The transformer 41 has its primary winding 42 connected across the adjustable resistor 71 and the second transformer 72 has its primary winding 73 connected to the terminals 17 and 18 across the condenser 16. The secondary windings 43 and 83 of the transformers 41 and 72, respectively, are connected to elements 38, 39 and to elements 88, 89 in the same manner as illustrated in Fig. 1. Load resistor 46 is connected between terminals 44 and 45, and load resistor 47 is connected between terminals 84 and 85, as in Fig. 1. However, in this case the connection 50 to the control electrode 30 may be connected directly to the end of resistor 46 connected to mid-terminal 44 of the transformer secondary winding 43. For equalizing the amplitudes or peak values of the output voltages across the load resistors 46 and 47, the adjustable resistor 71 is varied in resistance to make the amplitudes of the alternating current voltages equal between the terminals 11 and 17 and between the terminals 17 and 18.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A modulation detector comprising a pair of input terminals to which a modulated oscillatory wave may be applied, a phase lagging circuit connected to said terminals, a first rectifier coupled to said input terminals, a second rectifier coupled to said phase lagging circuit, a square law vacuum tube amplifier having input connections coupled to said first rectifier, a second square law amplifier having input connections coupled to said second rectifier, a common output circuit for said amplifiers for summing the outputs thereof, and a vacuum tube amplifier having a square root law with input connections coupled to the output circuit of said first-mentioned pair of vacuum tube amplifiers.

2. A modulation detector comprising a pair of input terminals to which a variable voltage may be applied varying in accordance with a modulated oscillatory quantity, an electric discharge device operating in a portion of its characteristic curve which follows a substantially square law, a rectifier interposed between said input terminals and said electric discharge device, a second electric discharge device having similar characteristics to the first, a second rectifier, and a phase lagging circuit, said phase lagging circuit and said second rectifier being interposed between the input terminals and the second electric discharge device, said electric discharge devices having a common output connection for producing an output voltage proportional to the sum of the squares of the input voltages.

3. Apparatus as in claim 2 with attenuation interposed between the first rectifier and the first discharge device for compensating unavoidable attenuation of the phase lagging circuit.

4. A modulation detector comprising a pair of input terminals to which a variable voltage may be applied varying in accordance with the modulated oscillatory quantity, a phase-splitting circuit connected to said input terminals and having two pairs of output terminals for producing two voltages in phase quadrature with each other, an electric discharge device operating in a portion of its characteristic curve which follows a substantially square law, a rectifier interposed between the first pair of said phase-splitter output terminals and said electric discharge device, a second electric discharge device having similar characteristics to the first, and a second rectifier interposed between the second of said pairs of phase-splitter output terminals and the second electric discharge device, said electric discharge devices having a common output connection for producing an output voltage proportional to the sum of the squares of the input voltages.

5. A modulation detector for a modulated oscillatory quantity comprising a pair of input terminals to which a modulated oscillatory wave may be applied, means coupled to said terminals for producing two versions of said wave substantially in phase quadrature with each other, and a squaring circuit responsive to said two wave versions for producing an output voltage varying as the sum of the squares of said two versions.

6. A modulation detector comprising a pair of input terminals to which a modulated oscillatory wave may be applied, means coupled to said terminals for producing two versions of said wave separated in phase by a predetermined phase angle, means responsive to a first one of said versions for producing a first signal component varying as the square of the instantaneous value thereof, means responsive to the second one of said versions for producing a second signal component varying as the square of the instantaneous value thereof, and means for combining said first and second components to produce an output signal varying as the square of the modulation of said oscillatory wave.

7. A modulation detector comprising a pair of input terminals to which a modulated oscillatory wave may be applied, means coupled to said terminals for producing two phase-separated versions of said wave, means responsive to a first one of said versions for producing a first signal component varying as the square of the instantaneous value thereof, means responsive to the second one of said versions for producing a second signal component varying as the square of the instantaneous value thereof, means for combining said first and second components to produce a resultant wave, and means responsive to said resultant wave for producing an output signal having instantaneous values proportional to the square root of the instantaneous values of said resultant wave.

HERBERT HARRIS, Jr.